(12) United States Patent
Reddy (10) Patent No.: US 6,736,758 B1
(45) Date of Patent: May 18, 2004

(54) VARIABLE TORSION CONVERTER

(76) Inventor: Christopher V Reddy, 1340 Holly Ave., suite D, Imperial Beach, CA (US) 91932

( * ) Notice: Subject to any disclaimer, the term of this patent is extended or adjusted under 35 U.S.C. 154(b) by 0 days.

(21) Appl. No.: 10/294,527

(22) Filed: Nov. 14, 2002

(51) Int. Cl.[7] .............................................. B60K 41/02
(52) U.S. Cl. .................. 477/179; 192/21.5; 192/103 R; 477/180
(58) Field of Search ................................ 477/179, 180, 477/174; 192/21.5, 57, 103 R (56) References Cited

U.S. PATENT DOCUMENTS

| | | | |
|---|---|---|---|
| 2,616,539 A | * 11/1952 | Wattenberger | 192/21.5 |
| 2,955,692 A | * 10/1960 | Thomas | 192/84.95 |
| 3,255,853 A | * 6/1966 | Klass et al. | 192/21.5 |
| 3,390,313 A | * 6/1968 | Peck | 361/233 |
| 4,782,927 A | * 11/1988 | Sproston et al. | 192/21.5 |
| 5,090,531 A | * 2/1992 | Carlson | 192/21.5 |
| 5,620,071 A | * 4/1997 | Ishikawa et al. | 192/21.5 |
| 5,845,753 A | * 12/1998 | Bansbach | 192/21.5 |
| 6,095,295 A | * 8/2000 | Park et al. | 188/267.2 |

FOREIGN PATENT DOCUMENTS

| | | | | |
|---|---|---|---|---|
| FR | 2668564 A1 | * | 4/1992 | F16D/37/02 |
| JP | 04272520 A | * | 9/1992 | F16D/37/02 |

* cited by examiner

Primary Examiner—Saul Rodriquez
Assistant Examiner—David D. Le
(74) Attorney, Agent, or Firm—Michael I. Kroll (57) ABSTRACT

A variable torsion converter for use with automobiles and other like vehicles using transmission whereas the present invention uses a magnetic clutch in which a ferromagnetic slurry forms a magnetic bond with a power output plate as the slurry is rotated by a power input plate that is electromagnetically energized accordingly in response to the operator depressing or releasing the accelerator pedal thereby eliminating mechanical connections that are prone to wear and tear and breaking.

5 Claims, 9 Drawing Sheets

VARIABLE TORSION CONVERTER

BACKGROUND OF THE INVENTION

1. Field of the Invention

The present invention relates generally to automobile transmissions and, more specifically, to a variable torsion converter utilizing a magnetic clutch, in which fluid containing ferromagnetic material is used to control the transmission of power. The fluid is contained between two plates at the ends of power drive shafts, where the transfer of power is regulated by the varying degree of the viscosity of the ferromagnetic fluid under a magnetic field. The strength of the magnetic field is controlled by a servo attached to an accelerator pedal. A stronger magnetic field applied to the ferromagnetic fluid increases the viscosity of the fluid, thereby transferring more power between the two plates of the power drive shafts. This invention makes the change in torsion in the power train smoother and more progressive unlike the conventional transmissions with finite gear settings.

When the accelerator pedal is depressed, power is supplied to a generator source. The pedal at the same time is potentially switching the power surplus to the magnetic coil by actuating a power control servo with a curved tooth in gear arrangement. This power control servo is a potentiometer switch that channels power the generator source to the magnetic coil. The magnetic coil is positioned as a sleeve around the mechanical power input shaft. As power is increased to the coil, the mechanical power output plate becomes increasingly magnetized. This magnetic energy is then converted into a magnetic field of slurry. The slurry is ferromagnetic particles in a fluid suspension. The slurry positioned between the mechanical power input and output plates acts as a bridge between the two opposing plates, transferring magnetic energy from the mechanical power input plate to the mechanical power output plate. The coil and the mechanical power input and output plates are secured in position by two bearing seated within the housing. The housing consists of an upper and lower section that is of an EMF shielding material. The two sections are adjoined with a gasket to create a seal for the fluid suspension.

Described below are the characteristics of the three operational states of the present invention.

The characteristics of the present invention while in an idle state. When a vehicle is idle or stopped, no power is being delivered to the magnetic coil. Without power within the magnetic coil, there is no magnetic energy in the mechanical power input plate. Thus there is no magnetic field in the ferromagnetic particle slurry that is positioned between the mechanical input and mechanical output plates. In turn, the mechanical output plate remains stationary.

The characteristics of the present invention while in an accelerated or active state. When a vehicle's accelerator pedal is depressed, the vehicle begins to move in either a forward or reverse direction. This is attained by the accelerator pedal delivering power to the coil. The coil utilizes this power to magnetize the plate on the mechanical power input shaft. In turn, the magnetized plate activates the ferromagnetic particles in the slurry sustained between the power output and power input plates, forming a "bridge" of magnetically bound particles capable of grasping and turning the mechanical power output plate by progressively securing engagement between the plates. The coil power increases as the accelerator pedal is further depressed. In turn the magnetic field in the slurry is intensified increasing velocity to the mechanical power output plate until the desired velocity is reached.

The characteristics of the present invention while in the state of deceleration. When a vehicle's accelerator pedal is released and the user wishes to slow the vehicle, less power is supplied to the coil. In turn, there is a reduction in the magnetism of the mechanical power input plate and a decrease in the velocity of the slurry. Subsequently there is a reduction in the speed of the mechanical power output plate, slowing the vehicle.

2. Description of the Prior Art

There are numerous other transmission devices designed for automobiles. There are also many other transmission devices for automobiles which provide non-mechanical power transmission. While these non-mechanical power transmission devices may be suitable for the purposes for which they were designed, they would not be as suitable for the purposes of the present invention as heretofore described. It is thus desirable to provide a power transmission using a variable torsion converter. It is further desirable to achieve torque conversion through the use of ferromagnetic material in fluid form in a varying magnetic field that can be electronically controlled.

SUMMARY OF THE PRESENT INVENTION

A primary object of the present invention is to provide non-mechanical power transmission.

Another object of the present invention is to provide smooth and progressive power conversion.

Yet another object of the present invention is to provide control of the power conversion with the use of electronic devices such as a servo.

Still yet another object of the present invention is to provide simplicity in design by employing ferromagnetic fluid instead of using complicated mechanical devices.

Another object of the present invention is to provide longevity to the transmission device by utilizing ferromagnetic fluid rather than mechanical parts that wear out in time.

Yet another object of the present invention is to lower the cost of manufacture of the transmission device.

Still yet another object of the present invention is to provide buffer for possible impact that can be delivered forward from the wheels, thereby protecting the engine.

Additional objects of the present invention will appear as the description proceeds.

The present invention overcomes the shortcomings of the prior art by providing non-mechanical power conversion means that can be easily controlled electronically while keeping the overall structure of the device simple and durable as well as economically affordable.

The foregoing and other objects and advantages will appear from the description to follow. In the description reference is made to the accompanying drawing, which forms a part hereof, and in which is shown by way of the illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the figures illustrate the Variable Torsion Converter of the present invention. With regard to the reference numerals used, the following numbering is used throughout the various drawing figures.

10 Variable Torsion Converter of the present invention
12 housing assembly
14 first housing member
16 second housing member
17 housing chamber
18 mechanical power output shaft
19 power input assembly
20 mechanical power input shaft
21 power output assembly
22 mechanical power output plate
24 mechanical power input plate
26 mechanical power output bearing
28 first mechanical power input bearing
30 second mechanical power input bearing
32 gasket
34 magnetic coil
36 electrical cables
38 ferromagnetic slurry
40 accelerator pedal
42 power control servo
44 bolt
50 mechanical gearbox
52 fan belt
54 generator
56 crankshaft
58 drive shaft

DETAILED DESCRIPTION OF THE PREFERRED EMBODIMENT

The following discussion describes in detail one embodiment of the invention. This discussion should not be construed, however, as limiting the invention to those particular embodiments, practitioners skilled in the art will recognize numerous other embodiments as well. For definition of the complete scope of the invention, the reader is directed to appended claims.

Figure 1:
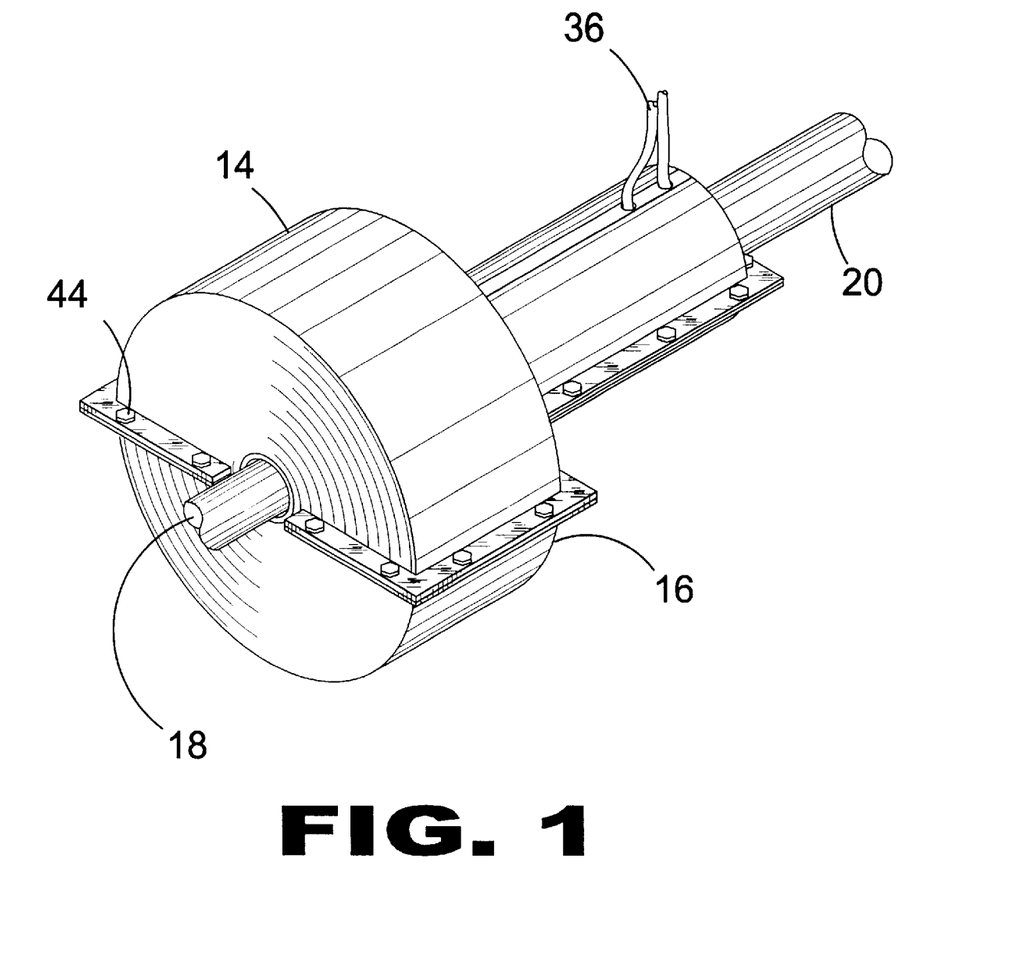
FIG. 1 is a perspective view of the present invention.

FIG. 1 is an additional element of the present invention. Shown is the present invention 10 having mechanical power input shaft 20 generally connected to an internal combustion engine crankshaft for the torque input. The mechanical power output shaft 18, located at the opposing end generally connected to an automobile's drive shaft, delivers desired mechanical power from the device to the drive train. The torque is then converted in the device 10 from the mechanical power input. Also shown are the electrical cables 36 connected to the magnetic coil 34 to the power control servo 42.

Figure 2:
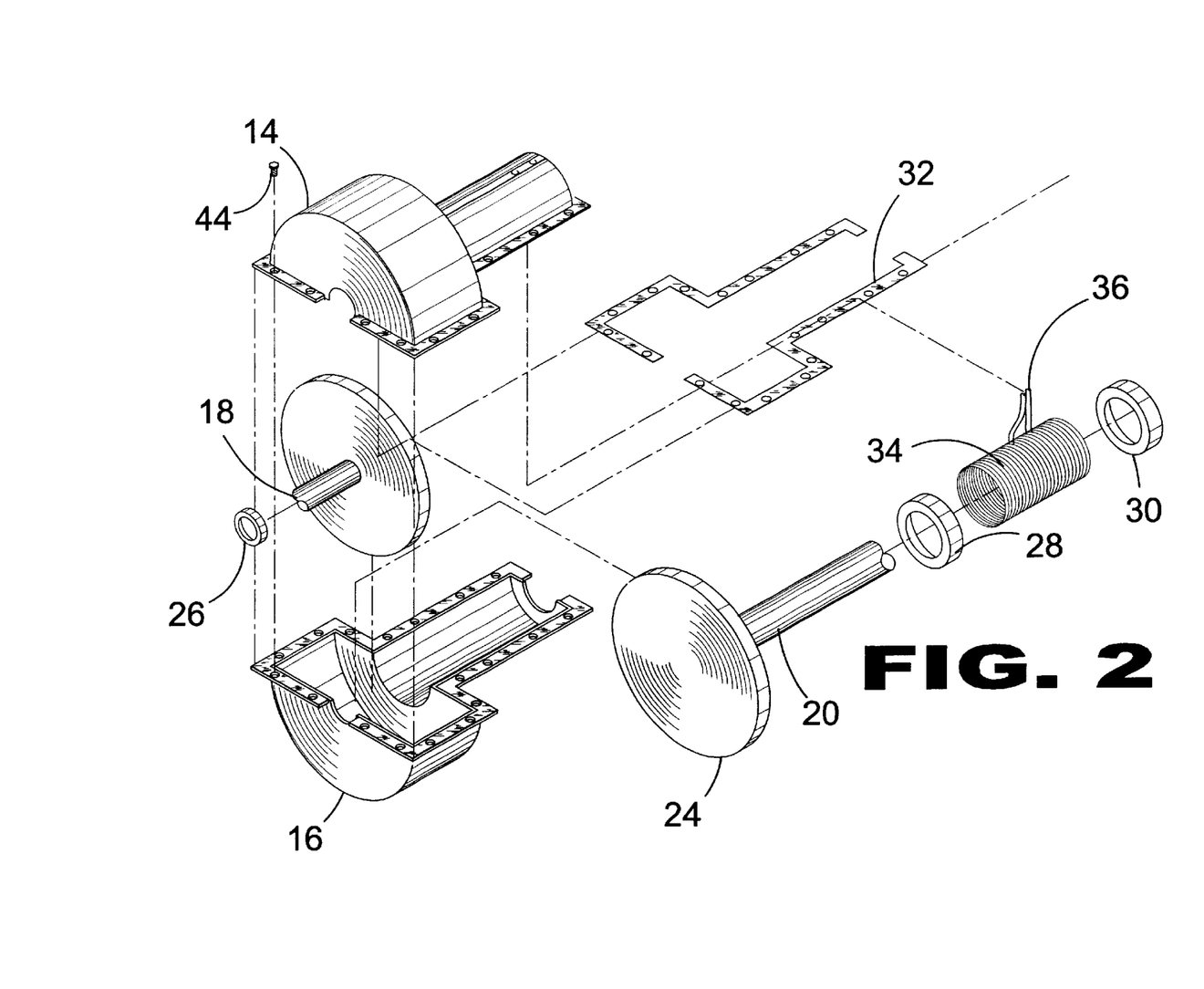
FIG. 2 is an exploded view of the present invention.

FIG. 2 is an exploded view of the present invention 10. Shown is the present invention 10 exploded into its individual components with the device having a housing assembly 12 comprising a first housing member 14 and a lower housing member 16 made with EMF shielding material. The two housing members 16, 18 are sealed with a gasket therebetween and secured to one another with a plurality of bolts 44 to form an air tight seal so that an enclosure for the device is formed. Also shown is the present invention 10 having a magnetic coil 34 slipped over the mechanical power input shaft 20 so that magnetic forces may travel through it's associated hardware to create magnetic forces of attraction on surface of the mechanical power input plate 24.

Figure 3:
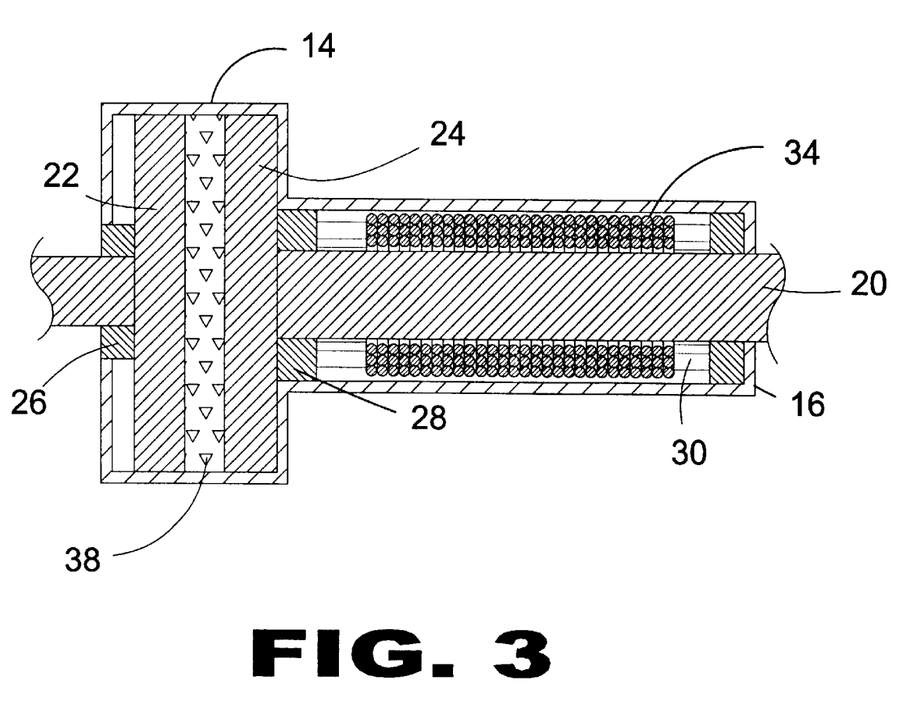
FIG. 3 is a sectional view of the present invention.

FIG. 3 is a sectional view of the present invention 10. Shown is the present invention 10 before the magnetic coil 34 is activated. The ferromagnetic particle slurry 38 in between the power output plate 22 and power input plate is not activated and the slurry 38 remains fluid. The mechanical power input shaft 20 turns under power, but the mechanical power output plate 22 and the mechanical power output shaft 18 remain stationary.

Figure 4:
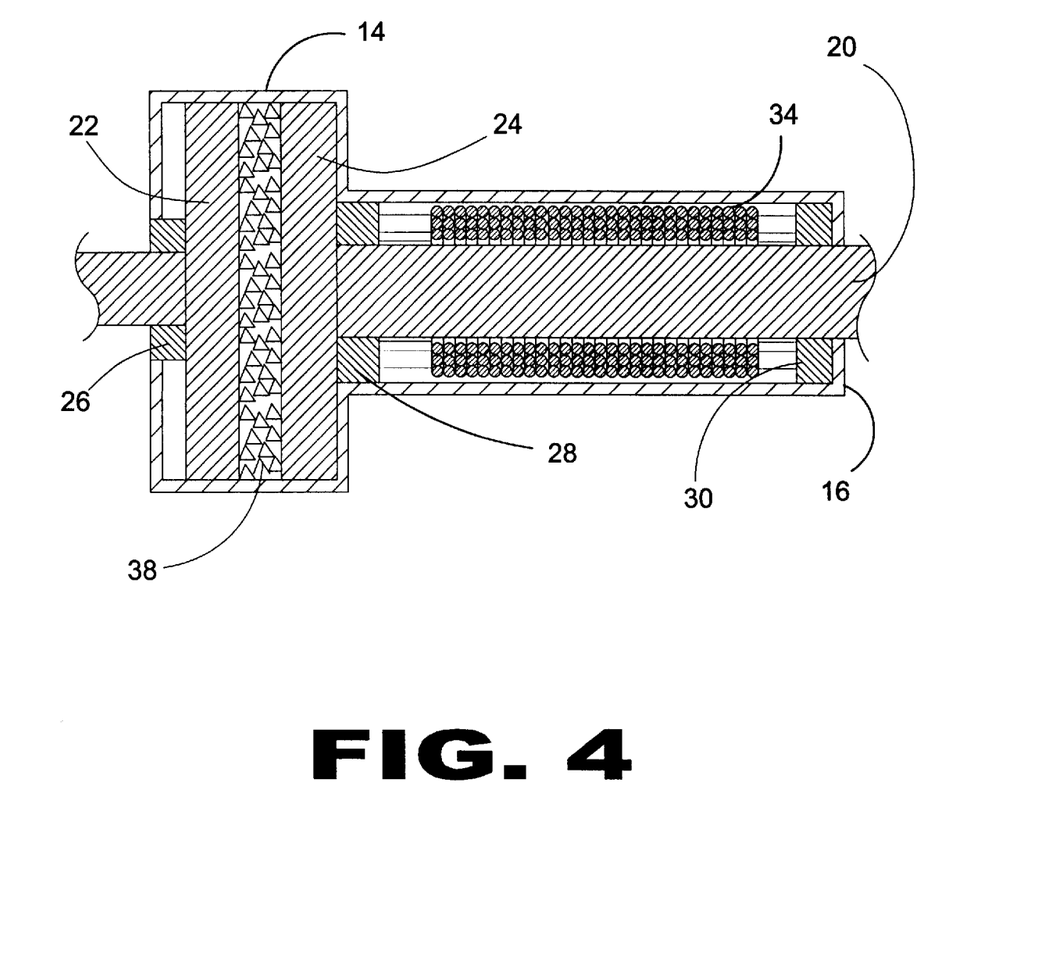
FIG. 4 is a sectional view of the present invention.

FIG. 4 is a sectional view of the present invention 10. Shown is the present invention 10 with the magnetic coil 34 activated and the ferromagnetic particles in the slurry 38 sustained between the two plates forming a bridge of magnetically bound particles capable of grasping and turning the mechanical power output plate 22 by progressively securing engagement between the plates as power increases in the magnetic coil 34.

Figure 5:
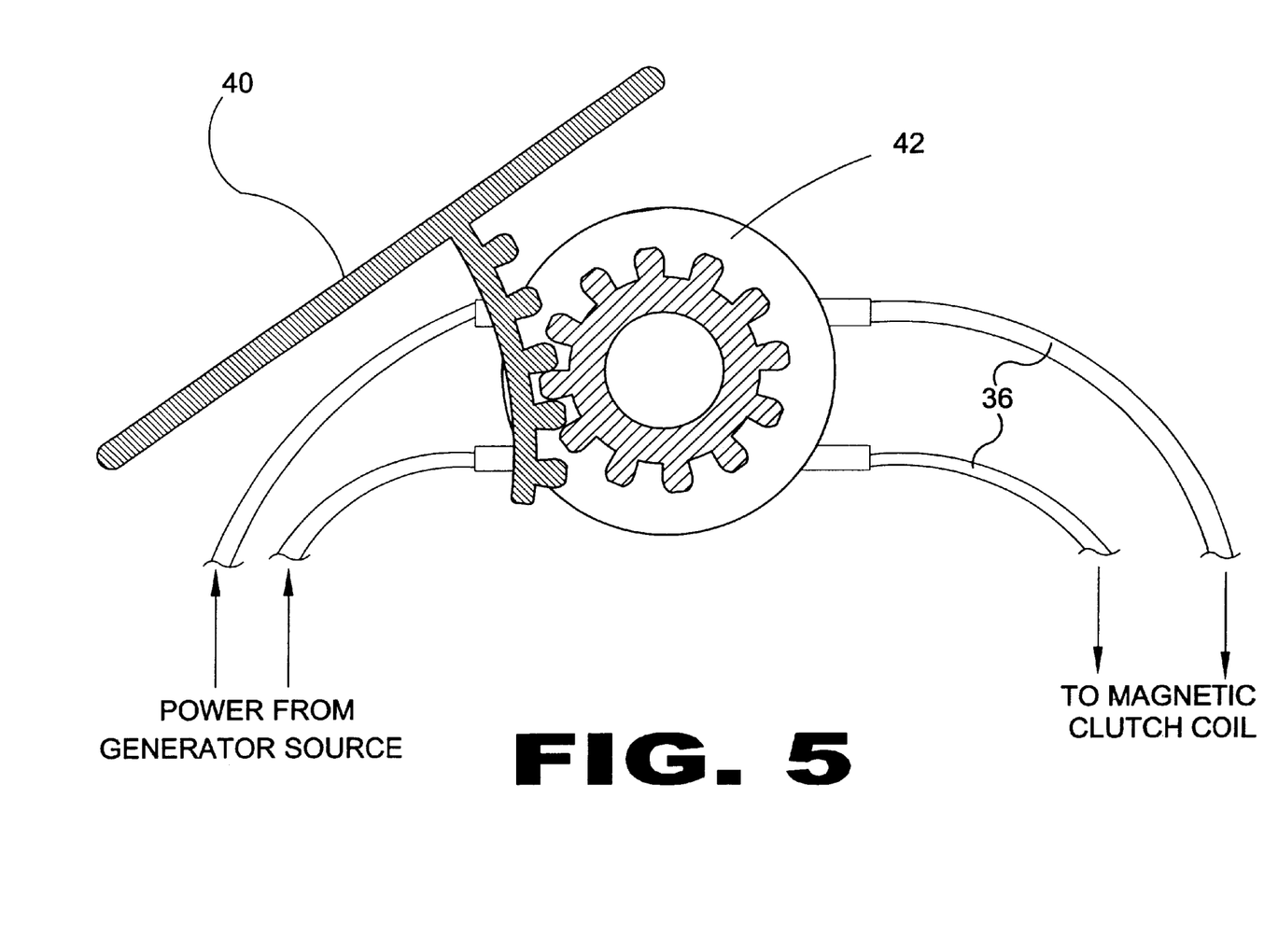
FIG. 5 is a side view of the power control servo.

FIG. 5 is a side view of the power control servo 42. Shown is the power control servo 42 of the present invention. The power control servo 42 is a potentiometer switch, which when activated by the accelerator pedal 40, gradually increases power from generator source to the magnetic clutch coil 34. This in turn increases the magnetic field within the slurry 38. The accelerator 40 is attached to the servo 42 with a curved tooth in gear arrangement.

Figure 6:
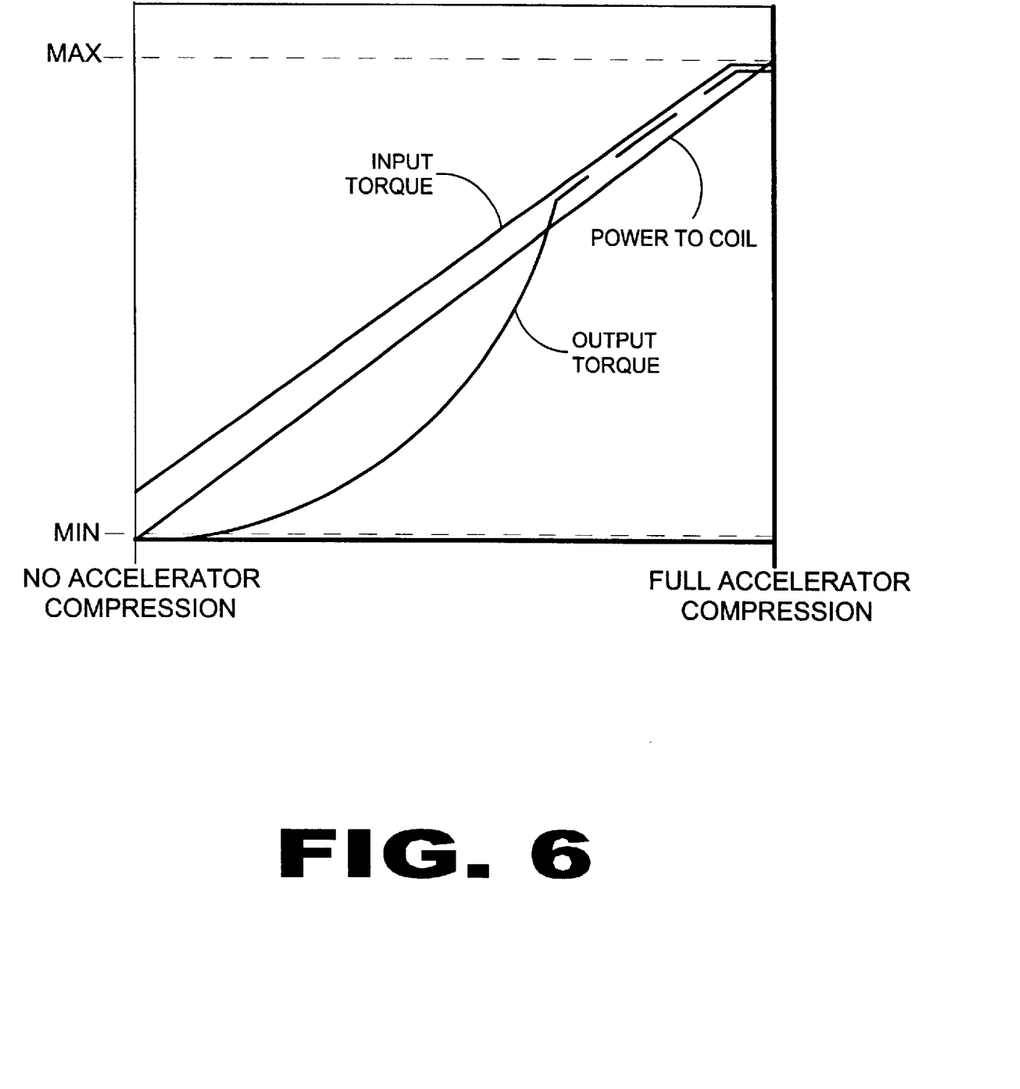
FIG. 6 is a chart of power distribution in the present invention.

FIG. 6 is a chart of power distribution in the present invention 10. Shown is the relationships between the engines input torque, the present inventions output torque, the distance between the mechanical power output plate 22 and magnetized plate 24 and the amount of power distributed to the magnetic coil 34 as the accelerator 40 is manipulated from an undisturbed position to a fully compressed position.

Figure 7:
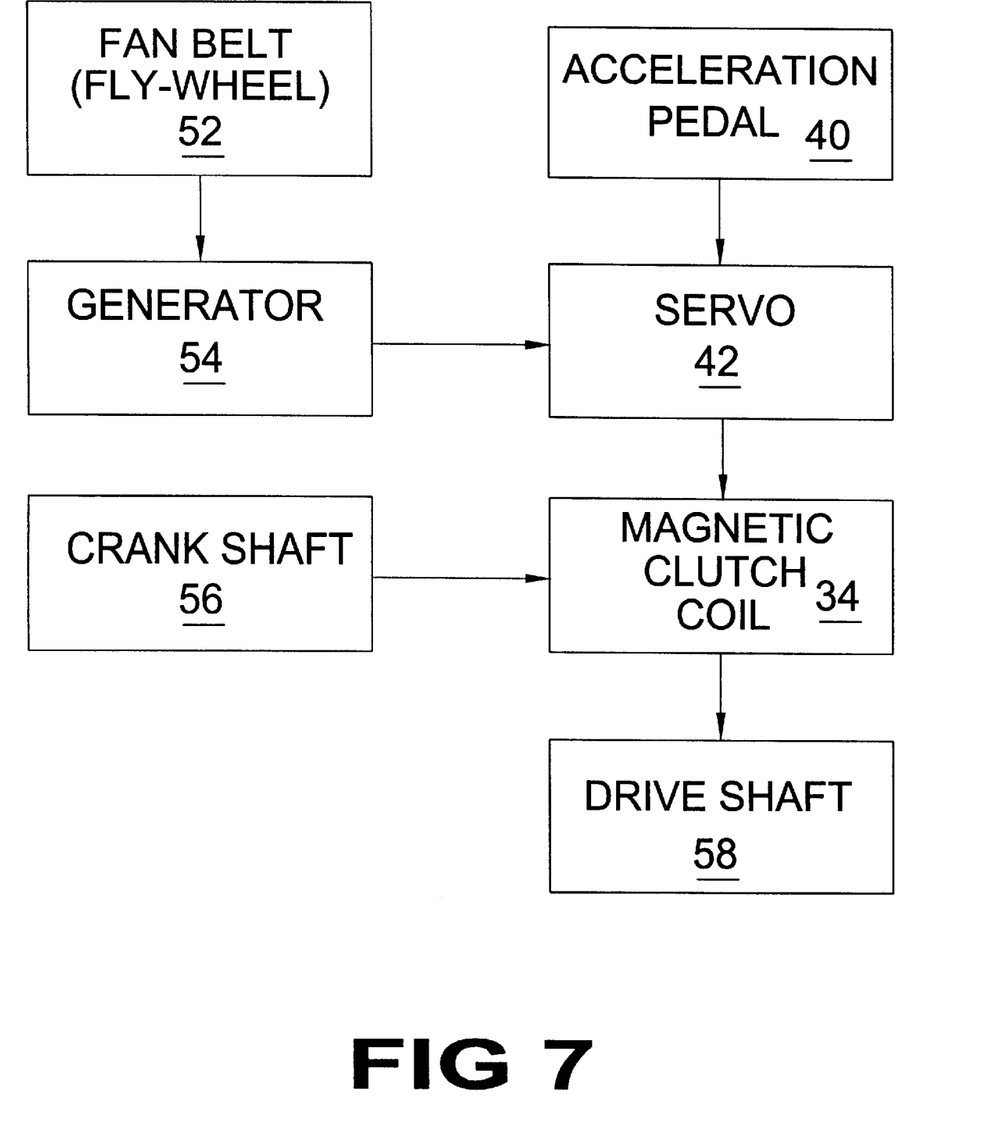
FIG. 7 is a flow chart of the present invention.

FIG. 7 is a flow chart of the present invention 10. Shown is the relationship between the operating systems included in the present invention operation.

Figure 8:
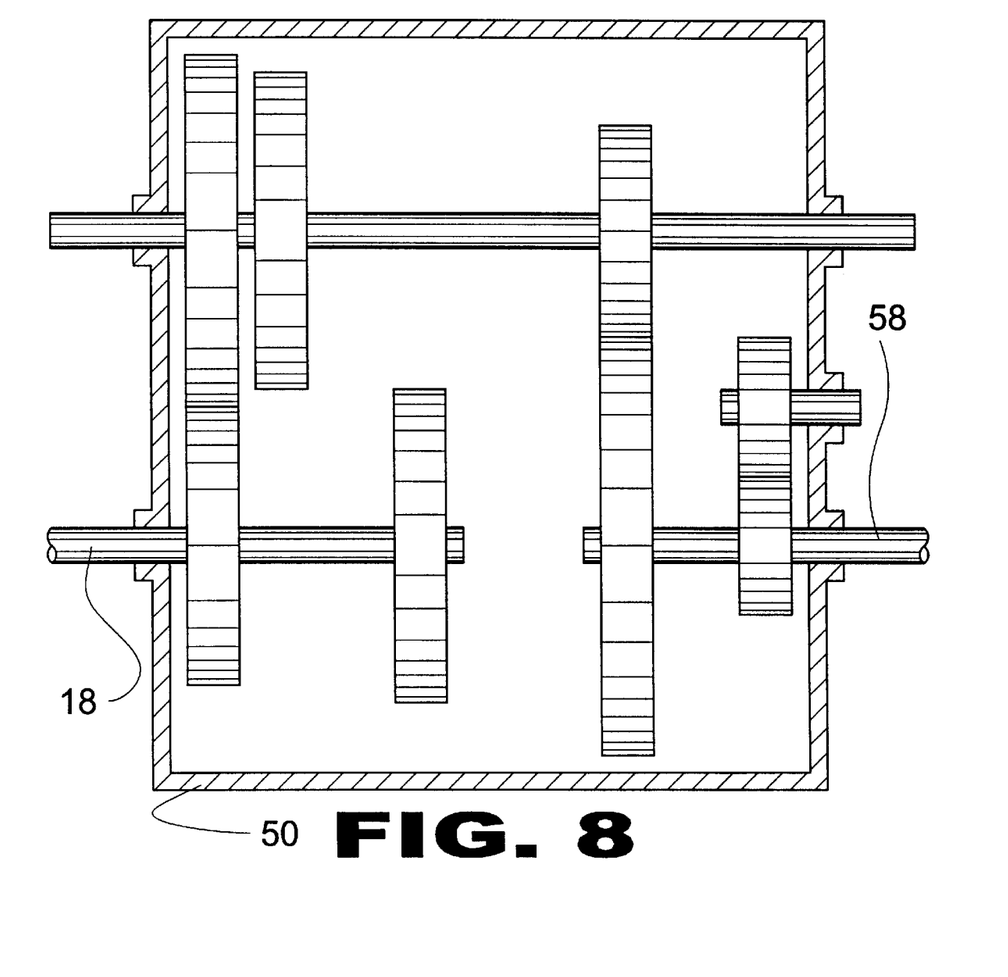
FIG. 8 is an additional element of the present invention.

FIG. 8 is an additional element of the present invention 10. Shown is the additional element of the present invention providing a gearbox 50 that may be installed to the mechanical power output plate 22 so that a reverse option may be used. Shown is the gearbox 50 engaged in the forward position.

Figure 9:
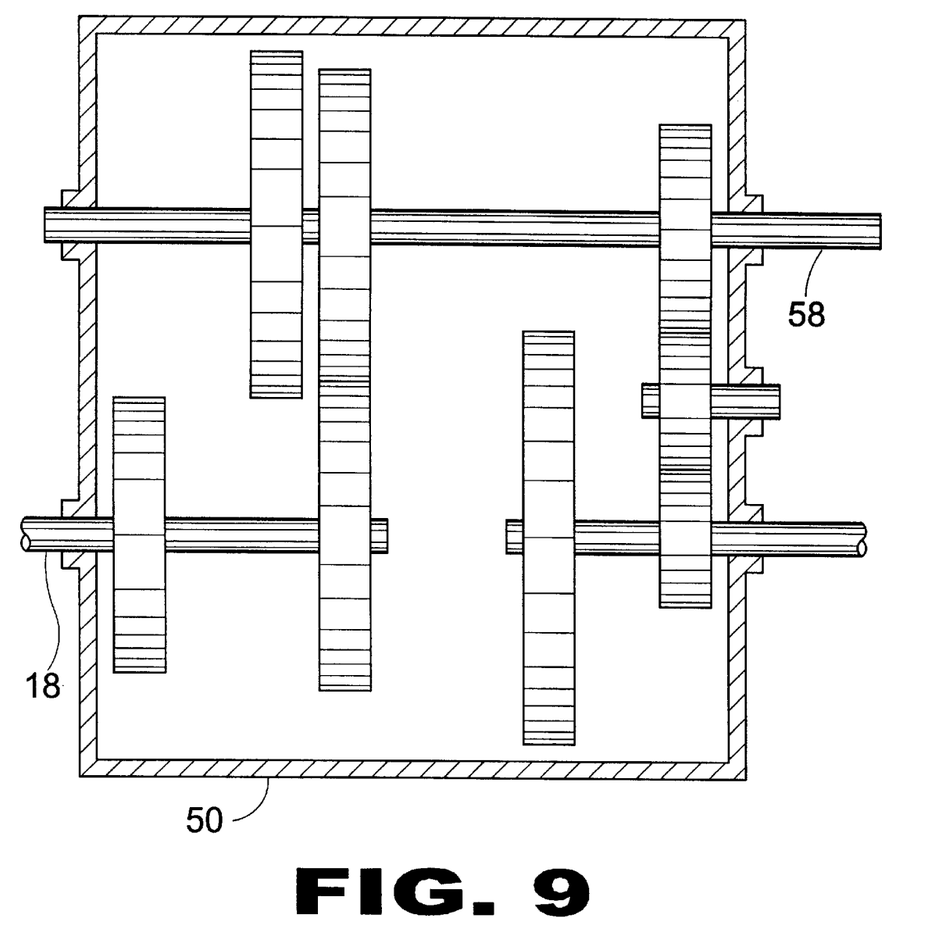
FIG. 9 is an additional element of the present invention.

FIG. 9 is an additional element of the present invention 10. Shown is the gearbox 50 with the reverse gear engaged.

It will be understood that each of the elements described above, or two or more together may also find a useful application in other applications differing from that described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A variable torsion converter, comprising:
   a) a housing element including:
      i) a first housing element forming a semi-circular chamber with a semi-cylindrical shaft conduit portion extending perpendicularly from a radial center portion thereof with semicircular recesses located in end walls on opposing distal ends thereof;
      ii) a second housing element asymmetrical to said first housing element;
      iii) Flanges extending perpendicularly from the edge of said first housing element and said second housing element with each flange having a plurality of corresponding recesses for bolting said first housing element to said second housing element;
      iv) a gasket conforming to said flanges of said first housing element and said second housing element to be placed therebetween to form a seal;
   b) a power input assembly including:
      i) a power input element comprising a metal circular plate and a cylindrical shaft extending perpendicularly from the center thereof wherein the distal end of said power input shaft communicates with and responds to a crank shaft of a vehicle, said power input element is sized to comfortably reside and rotate within said housing chamber and said shaft conduit;
      ii) means for electro-magnetically energizing said power input element;
      iii) means for sealing said power input conduit as the power input shaft transitions into said housing chamber and exits the opposing distal end of said power input conduit;
   c) a power output element including:
      i) a metal circular power output plate and a cylindrical shaft extending perpendicularly from the center thereof wherein the distal end of said power output shaft communicates and influences a drive shaft of the vehicle, said power output plate is sized to comfortably reside and rotate within said housing chamber in a face-to-face spaced apart relation with said power input plate;
      ii) means for sealing said power output conduit as said power output shaft passes through said housing chamber to the drive shaft;
   d) means for establishing a variable magnetic connection in said housing chamber between said power input plate and said power output plate as determined by the intensity of the electromagnetic charge applied to said power input element by said electromagnetic energizing means;
   e) means for allowing the operator of the vehicle to selectively control the intensity of the electromagnetic charge applied to said power input element by said electromagnetic energizing means.

2. A variable torsion converter as recited in claim 1, wherein said means for electro-magnetically energizing said power input element is a magnetic clutch coil proximally encircling the circumference of said power input shaft along the length thereof and connected to a power source via said operator manipulation means to electrify and magnetize said magnetic clutch accordingly thereby similarly magnetically charging said power input element.

3. A variable torsion converter as recited in claim 1, wherein said variable magnetic connection means is a ferromagnetic slurry residing in said housing chamber between said power input plate and said power output plate and remains neutral as long as no magnetic charge is applied thereto by the power input plate which spins freely in accordance to the crankshaft until such time that an electromagnetic charge is applied to said power input element and, thus, to said ferromagnetic slurry which in turn forms an electromagnetic bond with said power output plate that has heretofore remained stationary in the neutral position thereby initiating the rotation of said power output element and, hence, the affiliated drive shaft.

4. A variable torsion converter as recited in claim 1, wherein said operator control means is a power control servo including a potentiometer switch in electrical communication between said magnetic clutch coil and a generator source.

5. A variable torsion converter as recited in claim 4, wherein said power control servo gradually increases or decreases power to said magnetic clutch coil from said generator source in accordance to manipulation of an accelerator pedal by the operator.

* * * * *